(12) United States Patent
Chui et al.

(10) Patent No.: US 7,943,202 B2
(45) Date of Patent: May 17, 2011

(54) APPARATUS AND METHODS FOR PROVIDING A STATIC INTERFEROMETRIC DISPLAY DEVICE

(75) Inventors: Clarence Chui, San Jose, CA (US); Mark W. Miles, San Francisco, CA (US); Manish Kothari, Cupertino, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 452 days.

(21) Appl. No.: 12/116,524

(22) Filed: May 7, 2008

(65) Prior Publication Data

US 2009/0279173 A1 Nov. 12, 2009

(51) Int. Cl.
*B05D 1/32* (2006.01)
(52) U.S. Cl. ..................... 427/468; 359/242
(58) Field of Classification Search .............. 427/466, 427/468, 524; 359/242, 577, 578
See application file for complete search history.

(56) References Cited

U.S. PATENT DOCUMENTS

| | | | |
|---|---|---|---|
| 3,410,626 A | 11/1968 | Magrath | |
| 6,031,653 A | 2/2000 | Wang | |
| 6,055,090 A * | 4/2000 | Miles | 359/291 |
| 2006/0067646 A1* | 3/2006 | Chui | 385/147 |
| 2006/0209413 A1 | 9/2006 | Kim et al. | |
| 2006/0285184 A1 | 12/2006 | Phillips et al. | |
| 2008/0279498 A1* | 11/2008 | Sampsell et al. | 385/8 |
| 2009/0279174 A1* | 11/2009 | Miles et al. | 359/580 |

FOREIGN PATENT DOCUMENTS

WO   WO 95/17690   6/1995

OTHER PUBLICATIONS

International Search Report and Written Opinion mailed Aug. 14, 2009 issued in Application No. PCT/US2009/042916.
Wang et al., "Realization of Integrated Narrow Bandpass Filters in the Infrared Region," International Journal of Infrared and Millimeter Waves, Springer, Dordrecht, NL, vol. 25, No. 11, Nov. 1, 2004, pp. 1677-1683, XP001213989.

* cited by examiner

*Primary Examiner* — Alessandro Amari
(74) *Attorney, Agent, or Firm* — Weaver Austin Villeneuve & Sampson LLP

(57) ABSTRACT

Disclosed are apparatus and methods for fabricating a static interferometric display device. A plurality of sputtering modules is used to form static interferometric elements on a substrate. These elements each have a plurality of interferometric sub-elements that each has an interferometric stack. A first sub-element of each element is formed so that an interferometric modulation of light due to the first element's stack transmits at a first color, and a second sub-element of each element is formed so that a second color is transmitted. The sub-elements of each element are arranged with respect to each other so that all of the elements appear as a third color to a user if all the sub-elements of each element are left unmasked. A printing system is then used to mask one or more sub-elements of one or more elements so as to form, with the elements, a static image having multiple colors.

18 Claims, 7 Drawing Sheets

APPARATUS AND METHODS FOR PROVIDING A STATIC INTERFEROMETRIC DISPLAY DEVICE

BACKGROUND

The present invention is related to interferometric modulator displays (IMODs).

Display devices take various forms for providing images in the visible spectrum and/or ultra-violet and/or infrared wavelengths. One type of display device is called an interferometric modulator display. As used herein, the term interferometric modulator display or interferometric light modulator display refers to a device that selectively absorbs, transmits, and/or reflects light using the principles of optical interference. In certain embodiments, an interferometric modulator display may comprise an optical cavity layer having one or more thicknesses and is arranged with respect to a reflective layer and other semiconductor layers so as to provide optical interference of light incident on the interferometric modulator display. The composition and thickness of the layers allow for a variety of modulator display designs exhibiting different optical characteristics. Such devices have a wide range of applications, and it would be beneficial in the art to utilize and/or modify the characteristics of these types of devices so that their features can be exploited in improving existing products and creating new products that have not yet been developed.

SUMMARY

In one embodiment, a method of fabricating a static interferometric display device is disclosed. A plurality of sputtering modules is used to form a plurality of static interferometric elements on a substrate. The static interferometric elements each have a plurality of interferometric sub-elements that are each comprised of an interferometric stack. A first sub-element of each element is formed so that an interferometric modulation of light due to the first element's stack transmits at a first color, and a second sub-element of each element is formed so that an interferometric modulation of light due to the second sub-element's stack transmits as a second color. The sub-elements of each element are arranged with respect to each other so that all of the elements appear as a third color to a user if all the sub-elements of each element are left unmasked. The method further includes using a printing process to mask one or more sub-elements of one or more elements so as to form, with the elements, a static image having multiple colors.

In a specific implementation, the sputtering modules may be used so as to sequentially deposit a plurality of layers for each stack, including an optical cavity layer. The optical cavity layer of each sub-element of each element is formed by sputtering a material through one or more shadow masks. The shadow masks are configured to produce a first optical cavity thickness for the first sub-element of each element and a second optical cavity thickness for the second sub-element of each element so that an interferometric modulation of light due to the different stacks of each element transmit different colors. In a further aspect, the one or more shadow masks may include a plurality of parallel slots having a repeating pattern of different lengths. In this aspect, the substrate continuously moves along the lengths of the slots so that a plurality of optical cavity lines are formed, and the optical cavity lines have a repeating pattern of different optical cavity thicknesses that correspond to the repeating pattern of different lengths of the slots of the shadow mask.

In yet another aspect, the optical cavity lines may contribute to transmission of a repeating pattern of differently colored lines, including a red line, a green line, a blue line, and a white line. In an alternative embodiment, the optical cavity lines may contribute to transmission of a repeating pattern of differently colored lines, including a cyan line, a magenta line, and a yellow line.

In another implementation, the sputtering modules may be used to sequentially deposit a plurality of layers for each stack, including an optical cavity layer. The optical cavity layer of each sub-element of each element is formed by sputtering an optical cavity material through one or more shadow masks that are configured to produce a plurality of different optical cavity thicknesses for the different sub-elements of each element so that an interferometric modulation of light due to the different stacks of each element transmit different colors. In a further feature, the one or more shadow masks may include a plurality of holes through which the optical cavity material is sputtered, and the optical cavity material is sputtered through different sets of the holes for different time durations so as to form the different optical cavity thicknesses. In yet a further embodiment, the different optical thicknesses of the different sub-elements of each element may form a parallel line pattern of different colors. Alternatively or in addition, the different optical thicknesses of the different sub-elements of each element may form a checkerboard pattern of different colors. In another optional embodiment, the different time durations are accomplished by sputtering the optical cavity material through differently sized holes as the substrate moves beneath the one or more shadow masks so that more optical cavity material is deposited through a larger hole on a same area of the substrate than a smaller hole. In another implementation, the different time durations may be accomplished by sputtering the optical cavity material through different sets of same sized holes of the one or more shadow masks for different time durations.

In some embodiments, the printing process may be an ink jet printing process or a laser printing process. In some embodiments, the substrate is flexible. In certain embodiments, each masked sub-element may be masked with black ink so as to subtract at least a portion of the transmitted color of the sub-element. In certain implementations, each masked sub-element may be masked with ink that has a different color than any of the colors transmitted by the sub-elements. In other aspects, each masked sub-element may be masked with ink that has a same color as at least one of the colors transmitted by an unmasked sub-element so as to enhance the same color of the unmasked sub-element.

The method may include laminating a surface of the interferometric elements upon which masking has been performed by the printing process. At least one of the sputtering modules may be used with a shadow mask to form one or more marks positioned with respect to the elements so as to provide an alignment mechanism for the printing process.

An alternative embodiment includes a base substrate for a static interferometric display device. The base substrate comprises an array comprising rows and/or columns of static interferometric elements formed on the substrate, each element including at least a first sub-element and a second sub-element. An interferometric stack in the first sub-element is configured to interfere with incident light to transmit a first color. An interferometric stack in the second sub-element is configured to interfere with incident light to transmit a second color. The first and the second sub-element are arranged with respect to each so that the first color and the second color appear as a third color to a user across all of the interferometric elements.

In a specific aspect, the elements may comprise a plurality of repeating sets of parallel lines that are configured to transmit repeating sets of different colors, but are seen by a user as a same color. In another aspect, the elements may comprise a checkerboard pattern of repeating sets of sub-elements that are configured to transmit repeating sets of different colors, but are seen by a user as a same color. In yet another aspect, the elements may comprise (i) a checkerboard pattern of repeating sets of sub-elements that are configured to transmit repeating sets of different colors, but are seen by a user as a same color, and (ii) a plurality of repeating sets of parallel lines that are configured to transmit repeating sets of different colors, but are seen by a user as a same color. In some aspects, the substrate may be flexible, and may be plastic.

These and other features will be presented in more detail in the following specification and the accompanying figures which illustrate by way of example.

DETAILED DESCRIPTION OF THE SPECIFIC EMBODIMENTS

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display a stationary image, and whether textual or pictorial. More particularly, it is contemplated that the embodiments may be implemented in or associated with a variety of display types such as, but not limited to, billboards or signs, architectural structures, packaging, and aesthetic structures (e.g., display of images on a piece of jewelry).

In general, embodiments provide efficient, low cost techniques for fabricating a static interferometric display (IMOD). A standard base interferometric sheet of "IMOD paper" (e.g., which may be a single sheet or may be from a long roll) is initially fabricated that can later be printed upon so as to provide a custom color image. This base sheet is fabricated to include a plurality of interferometric elements (akin to pixels in an active display, except that the interferometric elements on the IMOD paper are static) that transmit different colors of light. Although the individual elements of the base sheet transmit different colors, the elements are densely arranged so that at typical viewing distances a user will see the base sheet as a single color, e.g., a white sheet, rather than a plurality of colors. A printing process may then be applied to the base sheet to mask specific interferometric elements or colors of the base sheet so that other unmasked elements and their associated colors dominate certain areas of the sheet. This printing process results in a multi-colored image or static IMOD. For example, with red, green, blue, and white sub-elements (akin to subpixels in an active display) in the interferometric elements, printing black ink over a region of the IMOD paper to mask off the red, green, and white sub-elements results in an interferometric blue color in the unmasked area. Since the resulting image is caused by an interferometric modulator effect, the image can have an iridescent quality and/or provide a color shifting effect as the viewer changes viewing angle.

Figure 1A:
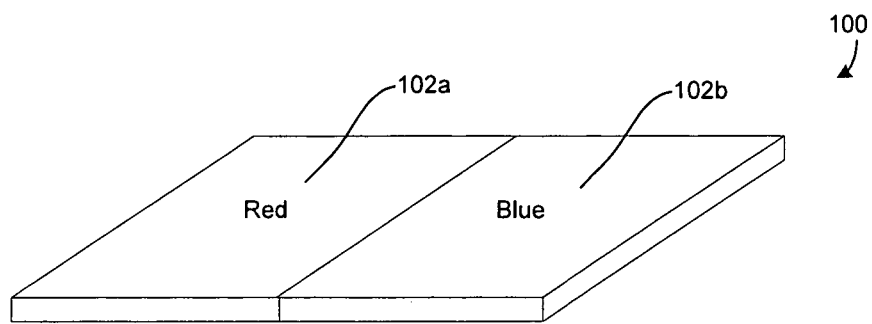
FIG. 1A is an isometric view depicting two adjacent static interferometric elements of a static interferometric display.

Before techniques are described, a standard static IMOD will first be described with respect to FIGS. 1A-1C. The term "static interferometric display" or IMOD refers to a device configured to display a static image using interferometric modulation of incident light. FIG. 1A is a highly simplified isometric view depicting two adjacent static interferometric elements 102a and 102b of a static interferometric display 100 (only two static interferometric elements are shown for clarity, while hundreds or many thousands of such devices may be included on, e.g., a 4"×6" piece of IMOD paper). Static interferometric elements can be configured to reflect and/or transmit light predominantly at selected colors, allowing for a color display, in addition to black and white. For instance, the interferometric element 102a may transmit red, while the interferometric element 102b may transmit blue.

In some embodiments, an interferometric modulator display comprises a row/column array or any suitable arrangement of these static interferometric elements to form a particular static image. Each static interferometric element includes two at least partially reflective layers separated by an optical cavity layer defined by air or a light transmissive material (e.g., a dielectric such as $SiO_2$, SiN, etc.). Incident light that transmits and/or reflects (which collectively may be referred to as "transmit" for convenience herein) from the two reflective layers and the optical cavity layer interferes constructively or destructively depending at least, in part, on the thickness and/or spacing of the optical cavity layer, producing an overall color for each interferometric element.

In one embodiment, a static interferometric element typically comprises several fused layers, which can include a partially reflective layer, such as chromium, and a transparent dielectric. The interferometric element is thus partially transparent, partially absorptive, and partially reflective, and may be fabricated, for example, by depositing one or more of the above layers onto a substrate. A partially reflective layer can be formed from a variety of materials that are partially reflective such as various metals, semiconductors, and dielectrics. The partially reflective layer can be formed of one or more layers of materials, and each of the layers can be formed of a single material or a combination of materials. Non-conductive or conductive materials may be used to form the reflective layers and/or to form or define the optical cavity layer.

The second reflective layer may be partially reflective, or may be fully reflective, depending on the embodiment. For convenience, the first partially reflective layer, for which partial transmission is functionally significant, may be referred to herein as a partially reflective layer, and the second reflective layer may be referred to as a reflective layer, and the two layers together may be referred to collectively as reflective layers, although it will be understood that the use of the term reflective layer is not intended to exclude partially reflective and partially absorptive layers. Similarly, the partially reflective layer may be alternately referred to as an absorber layer.

Figure 1B:
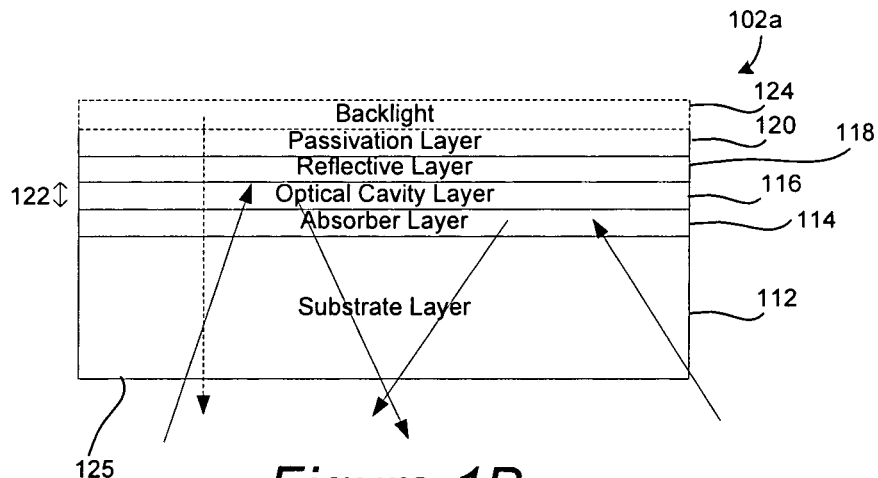
FIG. 1B is a cross section of the interferometric element of FIG. 1A in accordance with a first implementation.

FIG. 1B is a cross section of the interferometric element 102a of FIG. 1A in accordance with a first implementation. As shown, an absorber layer 114 is formed on an at least partially transparent substrate 112. An optical cavity layer 116 is formed between this absorber layer 114 and an at least partially reflective layer 118. A passivation layer 120 may also be formed over this reflective layer 118. A backlight 124 may optionally be positioned behind the passivation layer 120. Alternatively or additionally, a front light (not shown) may be positioned in front of or as part of the substantially transparent substrate 112 (below the substrate 112, in FIG. 1B).

In certain embodiments, the substrate layer 112 is formed from a glass or substantially transparent plastic material and the absorber layer 114 comprises an absorber material, such as chromium (Cr), molybdenum (Mo), etc. The optical cavity layer 116 may be formed from a dielectric layer that is at least partially optically transparent, such as SiO2, SiN, etc. In other implementations, this optical cavity layer 116 is formed from air located between the absorber layer 114 and the reflective layer 118, with appropriate spacers (not shown) separating the absorber layer 114 and the reflective layer 118. The thickness 122 of the optical cavity layer 116 may affect the transmissivity of such layer 116. In particular implementations, the reflective layer 118 is formed from a reflective material, such as aluminum (Al), silver (Ag), gold (Au), etc. The thickness of this reflective layer 118 will affect the transmissivity of such layer 118. The passivation layer 120 may be formed from a material that is electrically and chemically inactive and from an at least partially optically transparent material, such as a dielectric layer (e.g., silicon dioxide).

In certain embodiments, light emitted from the surface 125 of this interferometric element 102a may comprise a first portion of light, a second portion of light, and a third portion of light (if a backlight is used). The first portion of light is incident on the substrate 112, transmitted through the substrate 112, transmitted through the absorber layer 114, transmitted through the optical cavity layer 116, reflected by the reflective layer 118, transmitted back through the optical cavity layer 116, transmitted back through the absorber layer 114, transmitted back through the substrate 112, and emitted from the top surface 125 of the substrate 112. The second portion of light is incident on the substrate 112, transmitted through the substrate 112, reflected by the absorber layer 114, transmitted back through the substrate 112, and emitted from the top surface 125 of the substrate 112. The third portion of light is optional and may be produced from backlight 124, incident on the passivation layer 120 and transmitted through the passivation layer 120, transmitted through the partially reflective layer 118, transmitted through the optical cavity layer 116, transmitted through the absorber layer 114, transmitted through substrate 112, and emitted from the top surface 125 of substrate 112. (Light reflected by the surface 125 may be ignored, although anti-reflection coatings may be applied to reduce such light reflection.)

In certain embodiments, the first portion of light incident on the substrate 112 and the second portion of light incident on the substrate are infrared, visible, or ultraviolet light. In certain embodiments, the third portion of light from backlight 124 is infrared, visible, or ultraviolet light.

The color of the light that is transmitted through the surface 125 of the display device 102a may depend on an interferometric modulation of light as it is transmitted through the absorber layer, optical cavity layer, reflective layer, and/or passivation layer. The color depends on the characteristics of the materials of such layers, such as thickness, n (index of refraction), k (extinction coefficient), as well as the order of the placement of such layers.

The backlight 124 (or a front light) of certain embodiments includes a light guide slab or film that receives light from a light generator (e.g., injected along an edge of the light guide slab, guides the light along the guide slab, and redirects and emits the light towards the display device) to thereby provide substantially uniform illumination. The light guide slab can include extractor features located on a rear or front surface of the light guide slab that disrupt the propagation of light within the slab towards a back or front surface of the display device. In certain other backlight embodiments, the backlight 124 can include a substantially reflective surface that reflects or emits a substantial portion of the light which reaches the back light after being transmitted through the substrate 112, the absorber layer 114, the optical cavity layer 116, and the partially reflective layer 118. The IMOD can also angle shift in a wavelength-dependent manner. For example, the backlight can change color, so that light of a first color might undergo a first angular color shift due to the wavelength-dependent angle shift of the IMOD, and then light of a second color from the backlight undergoes a second angular color shift due to the IMOD.

Figure 1C:
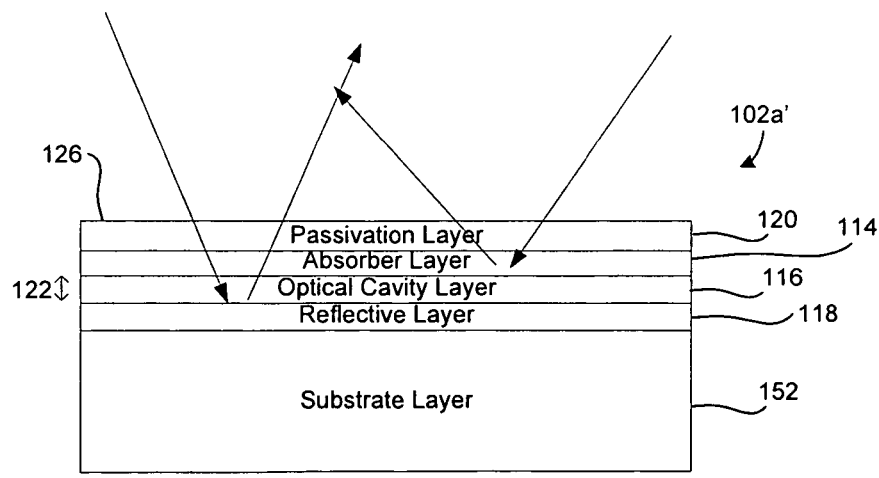
FIG. 1C is a cross section of an interferometric element in accordance with a second implementation.

FIG. 1C is a cross section of an interferometric element 102a' in accordance with a second implementation. The descriptions of the layers of FIG. 1B may apply to the identically labeled layers of FIG. 1C. As shown, the at least partially reflective layer 118 is formed on a substrate 152. The optical cavity layer 116 is formed between this at least partially reflective layer 118 and absorber layer 114. The passivation layer 120 may be formed over the absorber layer 114. In this example, a backlight is not used, but a frontlight (not shown) may be used above the passivation layer. Accordingly, the substrate 152 may be formed from a non-transmissive material, and the reflective layer may be formed from a fully reflective material. Alternatively, where the substrate 152 comprises aluminum foil, for example, a reflective surface of substrate 152 may be used as the reflective layer 118. In some embodiments, however, a backlight may be placed behind the substrate 152 in other implementations, and, accordingly, the substrate 152 and reflective layer 118 would both be at least partially transmissive.

In the illustrated embodiment, light emitted from the top surface 126 of this interferometric element 102a' may comprise a first portion of light and a second portion of light. The first portion of light is incident on the passivation layer 120, transmitted through the passivation layer 120, transmitted through the absorber layer 114, transmitted through the optical cavity layer 116, reflected by the reflective layer 118, transmitted back through the optical cavity layer 116, transmitted back through the absorber layer 114, back transmitted through the passivation layer 120, and emitted from the top surface 125 of the passivation layer 120. The second portion of light is incident on the passivation layer 120, transmitted through the passivation layer 120, reflected by the absorber layer 114, transmitted back through the passivation layer 120, and emitted from the top surface 125 of the passivation layer 120.

In some embodiments, a base sheet is fabricated that includes an arrangement of static interferometric elements that serves as a base for creating a plurality of different custom full color images as described further below. Any number and type of base sheets are contemplated herein. In general, each of the static interferometric elements of the base sheet includes a plurality of sub-elements. Each interferometric sub-element is formed or configured so as to interfere with incident light to transmit a particular color. Although the sub-elements of a particular interferometric element are configured to transmit different colors, the sub-elements are positioned with respect to each other such that a user sees these sub-elements as a single color, such as white (e.g., tightly packed red, green, blue, and white sub-elements of each interferometric element appear as white to a user). Said in another way, each element (somewhat analogous to a pixel of an active display, though the elements here are static) of the base sheet includes at least a first sub-element and a second sub-element. The first sub-element is configured to interfere with incident light to transmit a first color (e.g., red), while the second sub-element is configured to interfere with incident light to transmit a second color (e.g., green). Although the first and sub-elements are configured to transmit different colors, the first and second sub-elements are arranged with respect to each other (e.g., have a relatively high cycle or periodicity or density) so that the first and second color appear as a third color (e.g., white) to a user at normal viewing distances.

Figure 2A:
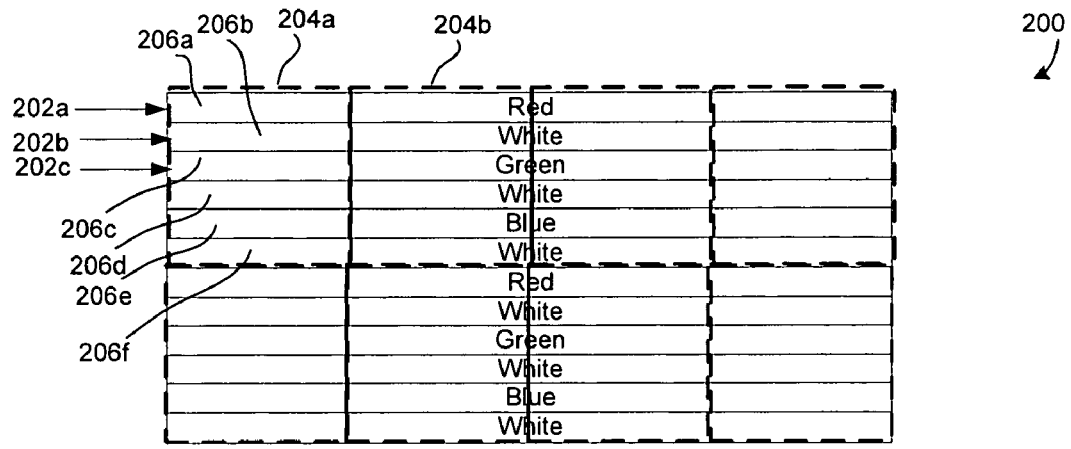
FIG. 2A is a top view of a static interferometric base in accordance with one embodiment.

FIG. 2A is a top view of a static interferometric base sheet 200 in accordance with one embodiment. As shown, the base sheet 200 may include a plurality of parallel lines 202 that are each configured to transmit a different color. In this example, the lines 202 are arranged in a white-blue-white-green-white-red (or WBWGWGWR) repetitive pattern. For instance, a red line 202a is adjacent to a white line element 202b, and this white line 202b is adjacent to a green line 202c, etc. The base sheet 200 may also be conceptually divided into a plurality of static interferometric elements, e.g., dashed line elements 204a and 204b, that each includes a plurality of differently colored sub-elements or line portions. For instance, element 204a includes a red sub-element 206a, a white sub-element 206b, a green sub-element 206c, a white sub-element 206d, a blue sub-element 206e, and a white sub-element 206f. The other interferometric elements, e.g., 204b, may also contain a pattern of line portions.

The dimensions of the elements and sub-elements of the illustrated base sheet described herein are exaggerated so as to simply the description. For instance, although the base sheet 200 of FIG. 2A is shown as having only two rows of four sub-elements, the base sheet may be formed so as to comprise 10's or 100's of sub-elements per inch (e.g., 100 dpi). In one implementation, each sub-element is less than about 0.010 inches (about ¼ mm) in length. Additionally, although the base sheets described herein are shown as containing elements and sub-elements that include white, red, green, and blue colors, any suitable color combination may be utilized. Example color combinations may include, but are not limited to, RGB, RBGY (red/blue/green/yellow), CMY (cyan/magenta/yellow), etc.

Figure 2B:
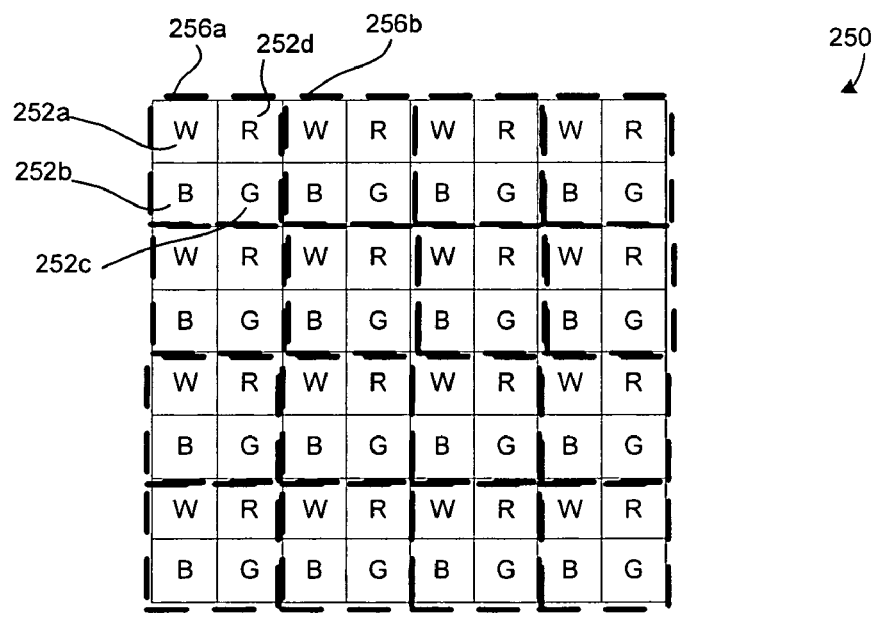
FIG. 2B is a top view of a static interferometric base in accordance with an alternative embodiment.

FIG. 2B is a top view of a static interferometric base sheet 250 in accordance with an alternative embodiment. In this embodiment, the base sheet 250 includes a plurality of static interferometric elements 256 that each include a plurality of sub-elements 252 that are arranged into a checkerboard pattern. For instance, static element 256a includes a white sub-element 252a, a blue sub-element 252b, a green sub-element 252c, and a red sub-element 252d. The other static elements, e.g., 256b, may include the same patterns of sub-pixels.

Any combination of base sheet patterns described herein may also be utilized. For instance, a combined line and checkerboard pattern (e.g., alternating colored lines and rows that contain square- or rectangular-shaped elements of different colors) may also be fabricated. In one implementation, the following pattern may be fabricated and repeating on a base sheet:

BRBR
[green stripe]
BRBR
[white stripe]

Additionally, although the base sheet pattern is described herein as containing line or square shaped elements, other shapes are contemplated. By way of examples, the base sheet pattern may include sub-elements in the form of ovals, rectangles, polygons, circles, etc. Although the base sheet pattern is depicted as having like-sized sub-elements in each element, other arrangements with unequal sized sub-elements are possible, and the arrangement and density of such sub-elements may be tailored to a specific application. For example, a base sheet pattern expected to be used for printing a landscape scene may have a relatively larger proportion of blue and white sub-elements on one portion of the sheet (e.g. for sky) and a relatively larger proportion of red, green, and white sub-elements on another portion (e.g. for trees, rocks, grass, etc.).

The above described base sheets can be fabricated so a user tends to not distinguish the different colors transmitted by the different sub-elements. In one embodiment, the entire base sheet (e.g., elements and sub-elements) would appear to have a single color to a user viewing the base sheet. For instance, at normal viewing distances and without the aid of magnification, sub-elements and elements can be densely distributed such that the base sheets 200 and 250 of FIGS. 2A and 2B would appear white to a user, rather than comprised of a plurality different colored sub-elements. Of course, if sub-elements and elements are not sufficiently densely distributed, and/or if a user would view the base sheet at a substantially close distance or a magnified view, the different colors of the sub-elements might be seen by the user.

Figure 3:
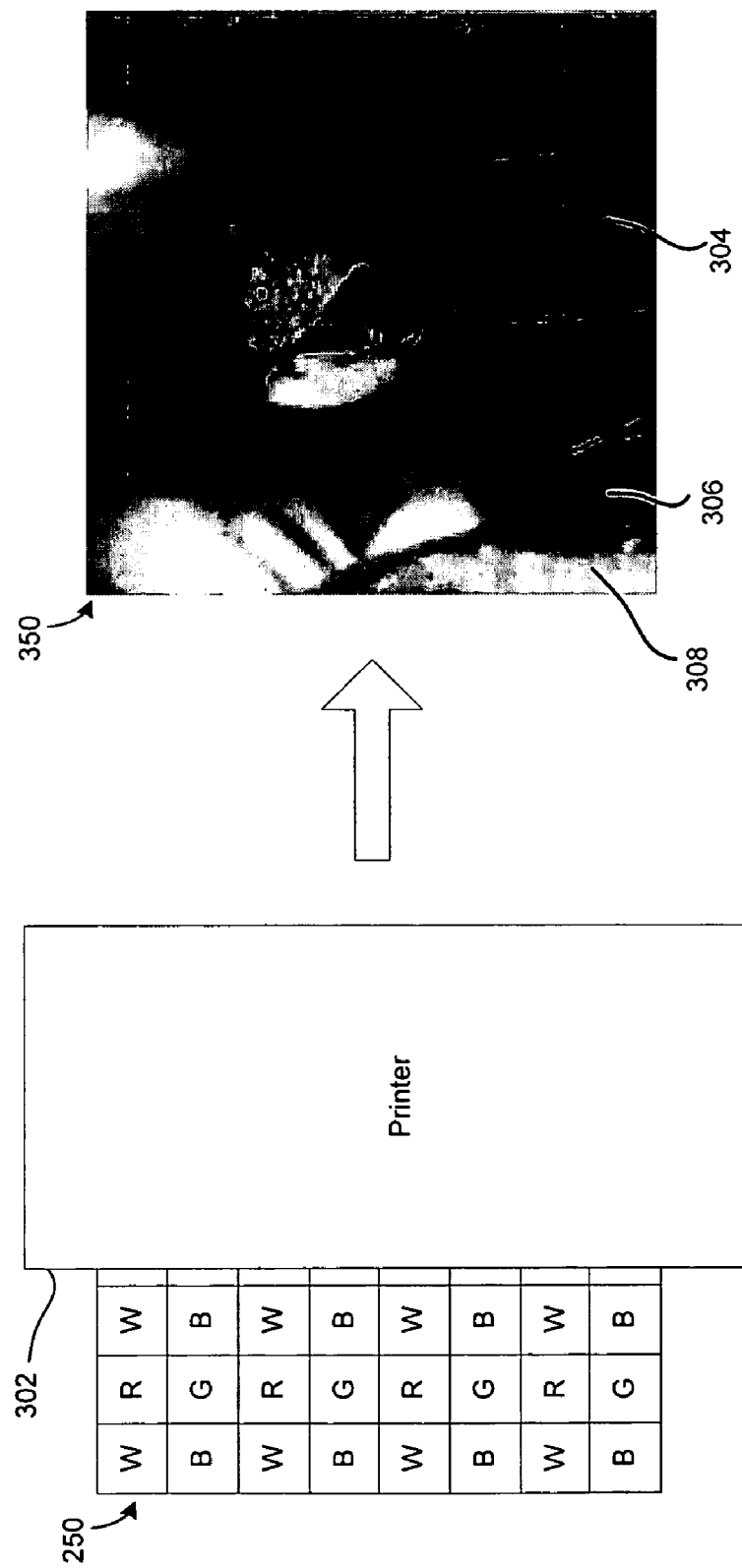
FIG. 3 is a diagrammatic representation of a printing process being applied to a base sheet to generate a full color image in accordance with one embodiment.

Once a base sheet is fabricated, a printing system or process may be used to mask particular sub-elements of the base sheet so as to create a full color image with the base sheet. FIG. 3 is a diagrammatic representation of a printing process being applied to a base sheet to generate a full color image in accordance with one embodiment. It should be noted that the colors are represented in gray scale in this illustration. A top view of the base sheet 250 is shown as undergoing a printing process by printing system 302. Prior to undergoing printing, the base sheet appears white to a user.

The printing process includes printing a dither pattern onto the base pattern 250 so as to form a full color image 350. For instance, portion 304 may now have a red color of varying intensity and hue, with a bright reddish portion at the head of the parrot fading to a darker shade of red at the chest of the parrot; portion 306 may have a light blue color; and portion 308 may have a yellow color. Although not enumerated, the wing of the parrot is blue at the lower left, fading to green, and then to red at the top of the wing. Particular color patterns on the base sheet may be achieved by this printing process by masking one or more sub-elements of one or more static interferometric elements of the base sheet. For example, one or more sub-elements may be masked by black ink. Referring back to FIG. 2B, when the white, blue, and green sub-elements (e.g., sub-elements 252a, 252b, and 252c) are all masked for interferometric element 256a, interferometric element 256a will appear to have a red color since the red sub-element 252d has been left unmasked. Masking a portion of the interferometric element 256a leads to a darker shade (less saturation) of red. A blue or green color may also be achieved by masking the other sub-elements 252 in a particular interferometric element 256.

A subtractive printing process has been described herein. That is, colors may be produced by masking or "subtracting" other colors. For instance, a red sub-element (akin to a sub-pixel in an active display) may be generated by masking the other colors (e.g., blue and green) in the same element with black ink. In this embodiment, very pure or saturated colors may be obtained. In another example, an element or pixel that differs in color (e.g., purple) from the sub-element colors (e.g., RGB) may be produced by leaving a combination of specific colors (e.g., RB) unmasked. Alternatively, the base sheet may be printed with one or more color of inks, instead of only black ink for various purposes, such as enhancing a particular color. For instance, red ink can be used as the dither mask to enhance the color red in one or more areas of the final image.

The base sheet can be fabricated using any suitable fabrication process, after which a printing process is implemented to create a multi-color image on the base sheet or portions of the base sheet. In certain fabrication processes, the layers of each interferometric element may be generated by multiple photolithography patterning steps. For example, an optical cavity of a first interferometric element may be formed by first patterning an oxide layer to have a first thickness over an absorber. An aluminum layer is patterned over the first optical cavity so that the absorber and first optical cavity are covered by a reflective layer. An adjacent second interferometric element's optical cavity is formed by depositing and patterning a second oxide layer to have a second thickness. This second optical cavity can be adjacent to the first optical cavity. Several techniques for fabricating static interferometric elements are further described in U.S. Pat. No. 6,055,090 by Miles et al., which patent is incorporated herein by reference for all purposes.

Although in certain embodiments a photolithography technique may be used to fabricate multiple interferometric elements on a base sheet that appears to a user as a single color, a multi-staged sputtering technique for forming the base sheet is described herein. A multi-stage sputtering process can provide an efficient, low cost solution for fabricating a base sheet.

Figure 4:
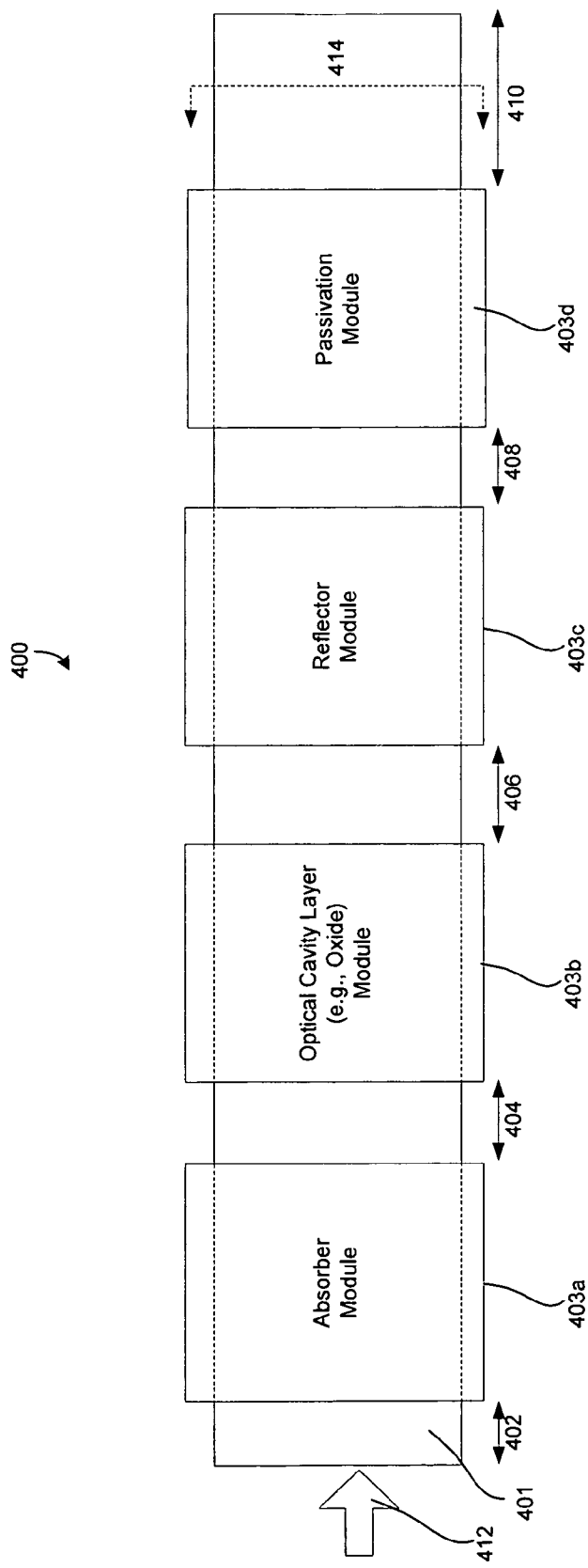
FIG. 4 is a diagrammatic representation of a multi-stage sputtering system in accordance with one embodiment.

FIG. 4 is a diagrammatic representation of a multi-stage sputtering system 400 in accordance with one aspect. As shown, the system 400 includes a plurality of sputtering devices or modules 403 for sputtering a sequence of layers of a base sheet 401 to thereby form a plurality of interferometric stacks of the base sheet.

The sputtering modules may take any suitable form for sputtering a material onto a sample. By way of example, the SmartWeb system which is available from Applied Materials, Inc. of Santa Clara, Calif. may be used as a sputtering system. In general, each sputtering module may include a target formed from the material which is to be sputtered and a sputtering mechanism for causing the material to sputter from the target onto the base sheet. In one implementation, the sputtering mechanism bombards the target with energetic ions to thereby cause atoms to be ejected from the target. These ejected atoms are then deposited on the sample. By way of examples, a plasma, ion source, or radioactive material that emits alpha particles may be used to supply the particles that bombard the target. The sputtering mechanism may operate to accomplish sputtering by bombarding the target with ions at a high enough energy to overcome the binding energy of the surface atoms of the target or to cause a heat spike sputtering effect, by way of examples. A heat spike (or thermal spike) mechanism causes collisions between the atoms in the target and the bombarding particles to occur very close to each other. These dense collisions induce the heat spike to thereby melt the target material and cause large amounts of the targets material atoms to sputter due to the flow of liquid to the surface and/or microexpolosions. Heat spike sputtering may be employed for heavy ions (e.g., Xe or Au or cluster ions) that bombard soft metals with a low melting point (e.g., Au, etc.).

Figure 7:
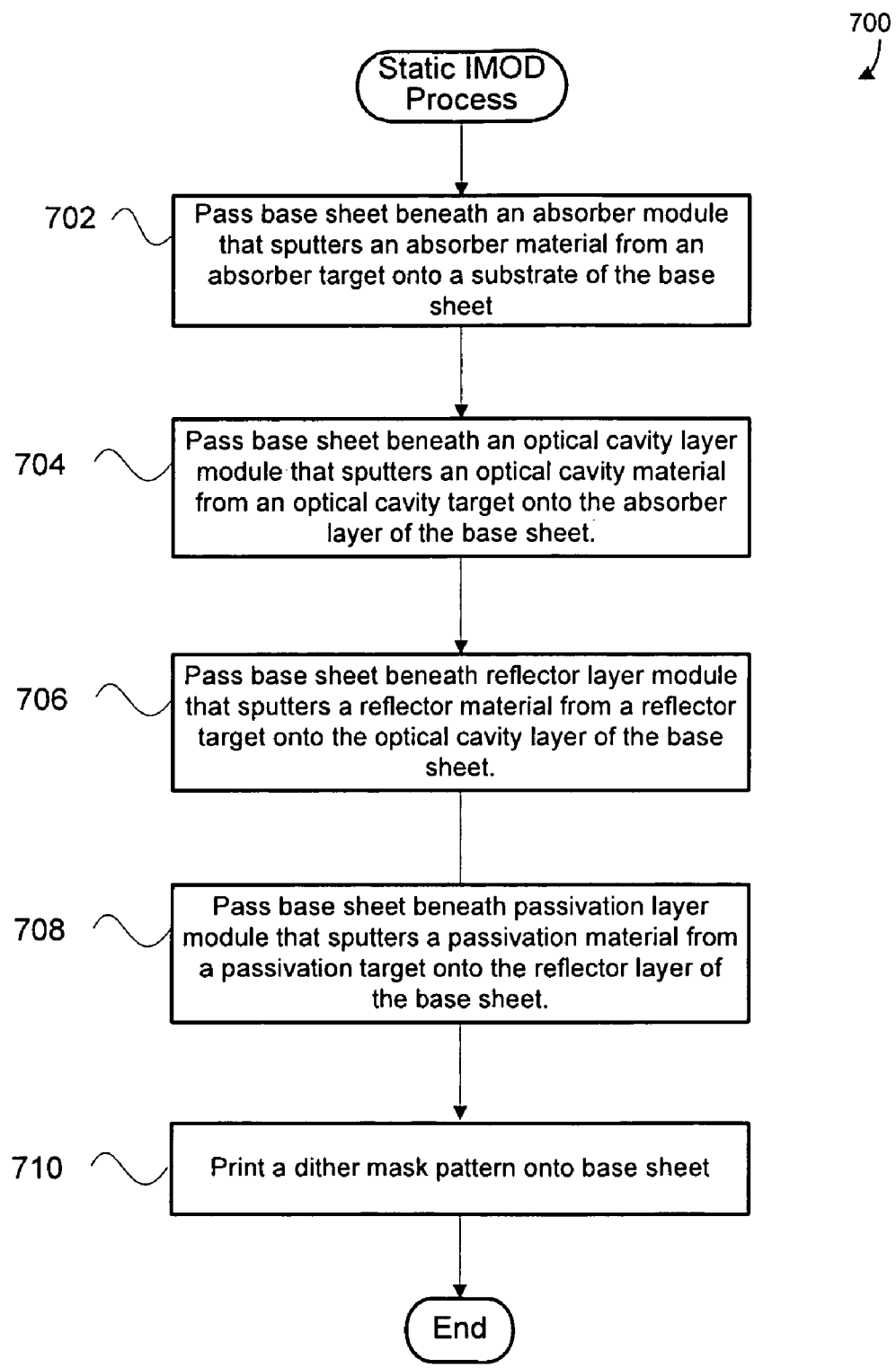
FIG. 7 is a flow chart illustrating a procedure for forming a static interferometric display device in accordance with one embodiment.

Each interferometric sub-element of the base sheet can be comprised of one of these interferometric stacks. Any type and number of optically transmissive, absorbing, and/or reflective materials may be utilized to form the interferometric elements or stacks of the base sheet. In the illustrated embodiment, each sputtering module 403 includes a different material target for depositing a different layer in each interferometric stack. FIG. 7 is a flow chart illustrating a procedure for forming a static interferometric display device in accordance with one embodiment. The process of FIG. 7 will be described in conjunction with the apparatus of FIG. 4.

In this illustrated example, the base sheet 401 (e.g., from a roll) is first passed beneath an absorber module 403a that sputters an absorber material from an absorber target (not shown) onto a substrate of the base sheet 401 (operation 702). As shown, the base sheet 401 moves in direction 412 to pass beneath absorber module 403a. The area 402 of the base sheet 401 that has not passed beneath the absorber module 403a would take the form of the substrate, while the area 404 of the base sheet 401 that has passed beneath the absorber module 403a would have an absorber layer deposited on the substrate. As described further with respect to FIG. 5, a shadow mask between the absorber target and the base sheet 401 may be used to prevent the absorber from depositing on portions of the base sheet.

The base sheet 401 may then be passed beneath an optical cavity layer module 403b that sputters an optical cavity material from an optical cavity target (not shown) onto the absorber layer of the base sheet 401 (operation 704). Thus, the area 406 of the base sheet 401 that has passed beneath the optical cavity layer module 403b includes an optical cavity layer deposited onto the absorber layer and/or substrate. A shadow mask between the optical cavity target and the base sheet 401 may be used to prevent the optical cavity material from depositing on portions of the absorber and/or substrate.

The base sheet 401 may then be passed beneath a reflector module 403c to sputter a reflector material onto the optical cavity layer of the base sheet 401 (operation 706). The base sheet 401 may then be passed beneath a passivation module 403d to sputter a passivation material onto the reflector layer of the base sheet 401 (operation 708). Thus, as the base sheet 401 emerges from the reflector module 403c, a reflector material is disposed on the optical cavity layer of the base sheet 401, e.g., in area 408. As the base sheet 401 exits the passivation module 403d, the passivation layer has been formed, e.g., in area 410, on the reflector layer of the base sheet 401. Again, shadow masks may be used to prevent deposition on areas of the base sheet 401.

The absorber, reflector, and passivation layers may all be deposited substantially uniformly on the base sheet. However, as described above, the optical cavity layer may be formed from an optically, at least partially transparent material, such as a dielectric material that has different thicknesses corresponding to the different colors transmitted by different interferometric elements. These different thicknesses of the optical cavity layer may be formed in any suitable manner. In one example, a shadow mask is used with the optical cavity module 403b to form an optical cavity layer having different thicknesses.

Figure 5:
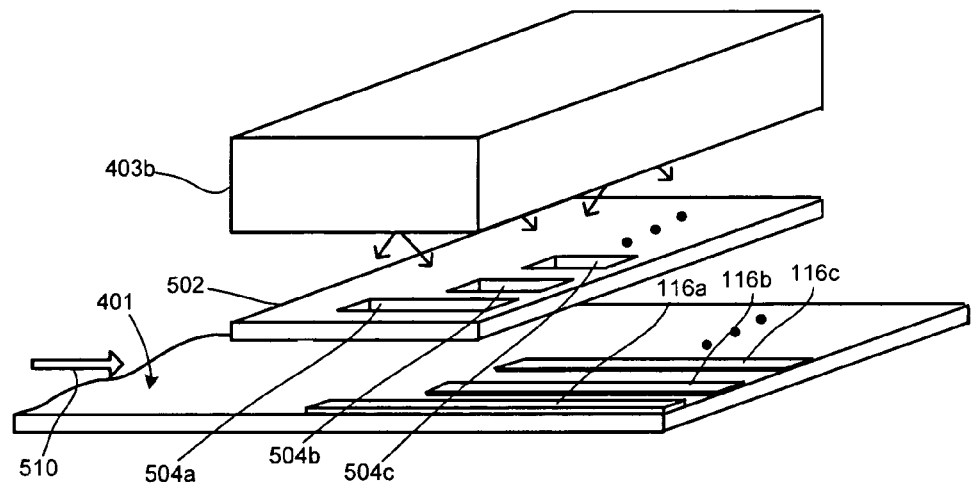
FIG. 5 is a side view representation of a shadow mask being used with the optical cavity module of FIG. 4 in accordance with a specific embodiment.

FIG. 5 is a side view perspective representation of a shadow mask 502 being used with the optical cavity module 403b of FIG. 4 in accordance with a specific embodiment. As shown, the shadow mask 502 includes a plurality of slots having different lengths, e.g., 504a~504c, repeated across the width of the shadow mask that is perpendicular to the direction 510 that the base sheet 401 is being moved with respect to the module 403b.

In the illustrated example, a single set of slots 504a, 504b, and 504c having three different lengths, respectively, are shown. However, this set of slots may be repeated across a substantial portion of the width of the shadow mask. The dimensions and number of the illustrated slots are exaggerated so as to simplify the illustration.

If the base sheet 401 is moved continuously, e.g., in direction 510, with respect to the optical cavity module 403b, the optical cavity material is deposited through the slots 504 of the shadow mask 502 to thereby form a set of parallel optical cavity lines, e.g., as illustrated in the base sheet 200 of FIG. 2A. In this example, a plurality of optical cavity material lines, e.g., 116a~116c, are formed on the absorber layer of the base sheet 401. Since each slot of a set has a different length through which a varying amount of optical cavity material may pass, each corresponding optical cavity material line of each set on the base sheet will be formed with a different thickness as it exits from the optical cavity module 403b. These different thicknesses may correspond to the different colors transmitted by the different interferometric element or sub-elements.

Moving the base sheet continuously with respect to the shadow mask slots of different lengths will generate an optical cavity layer having parallel lines of varying thicknesses, such as the base sheet of FIG. 2A may have different optical cavity layer thickness for the red, green, blue, and/or white stripes. However, other base sheet configurations are contemplated as described herein, and a multi-staged sputtering system may be used to produce different base patterns as described further below.

Figure 6:
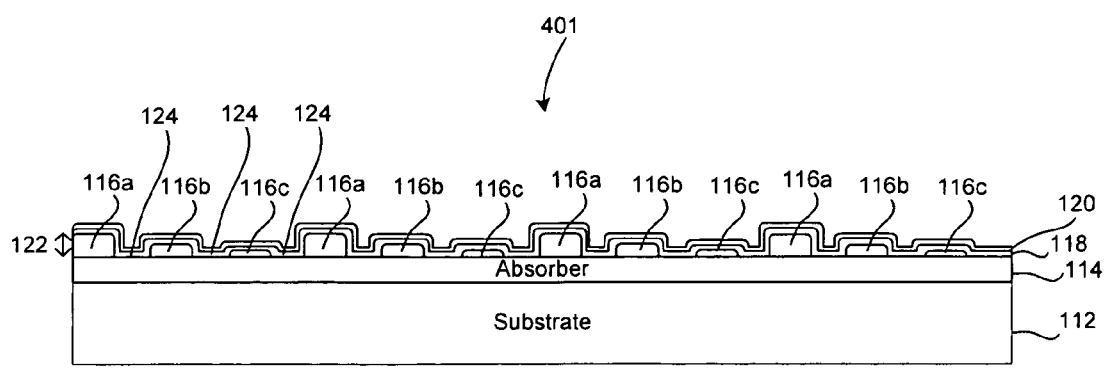
FIG. 6 is a side view of a base sheet after a plurality of interferometric stacks has been formed thereon by a multi-staged sputtering system in accordance with one implementation.

Regardless of the particular base pattern created, the resulting interferometric elements of such base sheet may each be configured in any suitable arrangement of layers, such as the stack arrangement of FIG. 1B. In other embodiments, the absorber and reflector modules may be modified so as to produce interferometric elements as illustrated in FIG. 1C. FIG. 6 is a detailed cross-sectional side view of a base sheet after a plurality of interferometric stacks has been formed thereon by a multi-staged sputtering system in accordance with one implementation. The components of FIG. 6 are not to scale and some of the element sizes may be exaggerated for illustrative purposes. For example, this side view may correspond to a side view of the base sheet 401 of FIG. 4 as seen from direction 414 after the sheet 401 has exited the passivation module 403d.

As shown, absorber layer 114 is disposed on substrate 112, e.g., by absorber module 403a. The optical cavity layer 116 is formed by depositing optical cavity material through a shadow mask, e.g., 502, into parallel lines 116a~116c with different thicknesses on the absorber layer 114. In this embodiment, the optical cavity lines 116 are separated by areas 124 in which optical cavity material is not deposited (e.g., between the slots of the shadow mask). Reflector layer 118 is disposed over the optical cavity layer, while passivation layer 120 is disposed over the reflector layer in this embodiment.

When incident light is transmitted through different areas of the base sheet 401, an interferometric modulation of the incident light due to the different material compositions and/or thicknesses in such areas transmits at different colors. Each area that includes the same thickness of optical cavity material or no optical cavity material would transmit at a substantially same color. For instance, the areas that include optical cavity lines 116a that have a thickness 122 would transmit at a first color, such as blue. The areas that include no absorber and/or optical cavity material, e.g., areas 124, would transmit a white color. In contrast, the areas, which include optical cavity lines 116b that have less thickness than lines 116a, would transmit at a different color, such as green. Additionally, the areas that include optical cavity lines 116c that have less thickness than lines 116b would transmit at a different color, such as red. However, since these optical cavity lines are densely spaced relative to each other, a user would tend to see a single color for the entire area, including the optical cavity lines 116a~116c and the areas with no absorber and/or optical cavity material, of the base sheet 401.

As described above, different colors may next be produced on the base sheet by printing a dither mask pattern onto this base sheet 401 (operation 710). The printing system may utilize any suitable printing technology, such as ink jet, laser, etc. A lamination material may also be applied to the top of the printed display so as to protect the ink. Alternatively, in some embodiments a layer of masking material is applied over the entire base sheet 401, and fused or adhered to the base sheet 401 only in selected areas. For example, in some embodiments a laser may be used to fuse selected areas of a toner that is applied over the entire base sheet 401, and the non-adhered toner can later be removed.

The density or cycle of the sub-elements depends on several factors, such as the desired viewing distance and angle, the thickness of the substrate upon which the ink is printed, the orientation of the sub-element pattern relative to the viewer, the specific sub-element pattern used (e.g., hexagonal, bright elements on diagonal, bright elements vertical or horizontal), etc. For instance, the ink dot size and underlying sub-element size may be larger than the distance between the sub-element and the ink dot, so that changing the angular orientation of the viewer to the printed base sheet 401 does not dramatically change the apparent color of the printed base sheet 401. A thin substrate may be used to obtain higher resolution images in some embodiments such as FIG. 1B in which light travels through the substrate and where the dither mask is applied to the substrate at a relatively large distance from the interferometric element. Similarly, the thickness of the passivation layer 120 in FIG. 1C may be less than about 1 µm, to prevent color shift due to an unintended unmasking of the masked sub-elements caused by viewing at an angle. In certain embodiments, the sub-elements would be arranged so as to have a cycle or period that is less than 1 mm. In one implementation, each static interferometric element has a size of less than 0.5 mm.

A mechanism for registering the dither mask with the underlying sub-elements of the base sheet may be implemented in some embodiments. In one aspect, one or more marks may provide an alignment mechanism for the printing system. In a specific embodiment, one or more marks having a different color, e.g., black, or shape, than the rest of the base sheet may be provided to align the base sheet with respect to the base sheet. This mark may be formed by using at least one of the sputtering modules with a shadow mask to form such mark. In one example, marks may be provided along the top and bottom horizontal edges of the base sheet. Such marks may be manufactured into the base sheet by providing a top and bottom slot in the shadow mask (FIG. 5) having a different length and resulting color than the other slots. Such registration marks can provide a way to laterally align the base sheet during the printing process. An alignment process may include aligning a corresponding mark on the printing mask relative to such fiduciary of the base sheet.

In alternative embodiments, one or more shadow masks (and/or one or more optical cavity modules) with a plurality of specifically arranged hole portions may be used to produce a checkerboard pattern, such as the base sheet of FIG. 2B. In this implementation, the speed of the base sheet relative to the one or more shadow masks is stopped or altered so as to produce different thicknesses in the different sub-element portions as desired. For the base sheet of FIG. 2B, the base sheet may be stopped at different sets of shadow mask holes for different amount of times so that different heights for the checkerboard pattern may be obtained.

Figure 8:
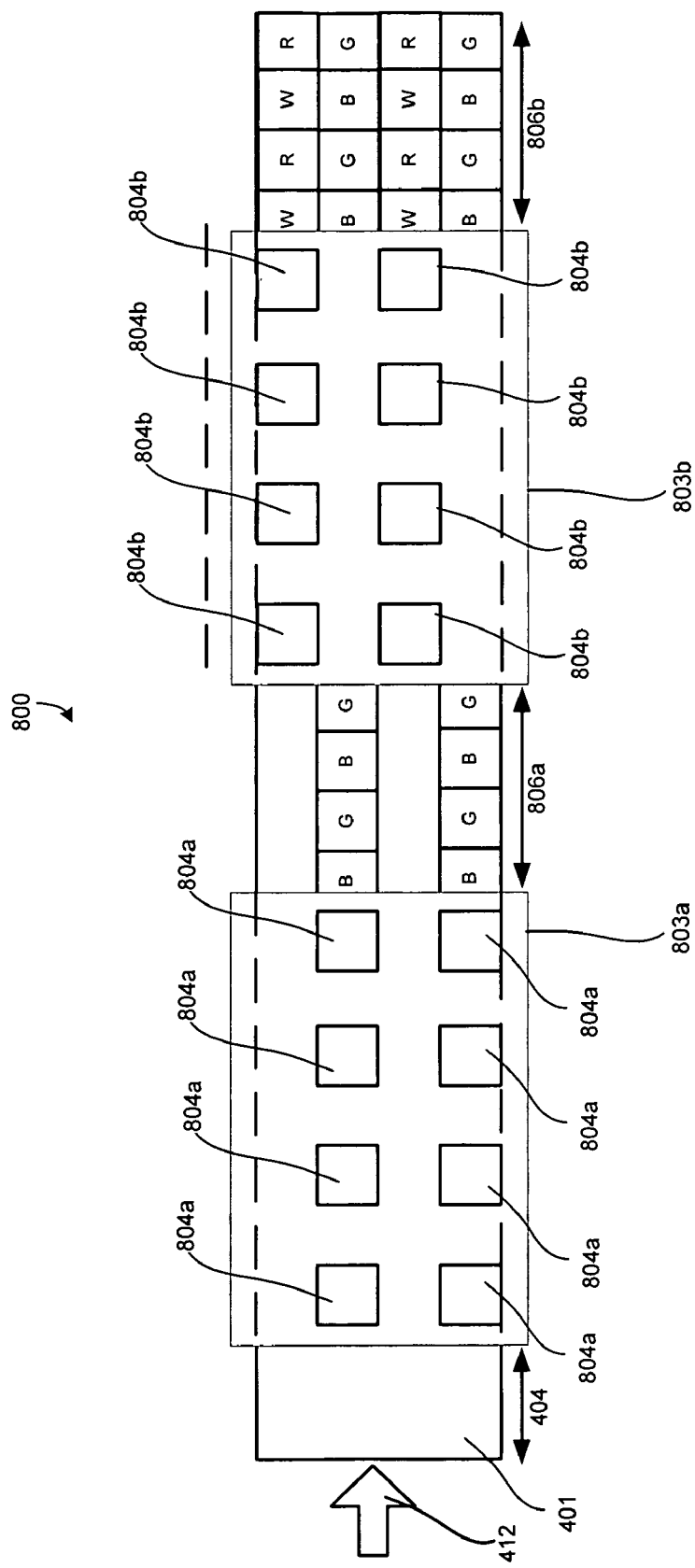
FIG. 8 is a diagrammatic top view representation of a portion of a sputtering system for forming a checkerboard pattern in accordance with an alternative embodiment.

FIG. 8 is a diagrammatic top view representation of a portion of a sputtering system 800 for forming a checkerboard pattern in accordance with an alternative embodiment. This sputtering system 800 includes two optical cavity layer modules (not shown) having two shadow masks 803a and 803b. Although not shown, this sputtering system may also include absorber, reflector, and passivation modules similar to that described above. Prior to moving under the first optical cavity, the base sheet 401 may have an absorber layer (e.g., in area 404) or a reflective layer disposed thereon.

The first shadow mask 803a may have a plurality of holes 804a for forming the sub-elements in a first set of rows that have a same color pattern. In the present example, the first mask 803a is used to form the rows that include alternating blue and green sub-elements. The second mask 803b also has a plurality of holes 804b for forming the sub-elements of a second set of rows that have a same color pattern that differs from the first set of rows. Although the holes 804a of the first row are depicted as being the same size as the holes 804a of the second row, and the holes 804b of the first row are depicted as being the same size as the holes 804b of the second row, such holes may be of differing sizes to accommodate deposition of different thicknesses in each row, and/or different sizes of sub-elements in each row (e.g. for non-square interferometric elements).

In this implementation, the base sheet 401 is moved in direction 412 and positioned under the first shadow mask 803a of the optical cavity module at a first stationary position. The holes 804a of the first shadow mask 803a are arranged in this embodiment so that the optical cavity layer is sputtered through these holes to form a set of first color sub-elements of the first set of rows. The time duration of the sputtering is selected so as to achieve the desired thickness of the optical cavity that will result in transmission of the first color. For example, the optical cavity for all of the green sub-elements is initially formed. During this process, an optical cavity layer is not formed for the blue sub-elements that are positioned between the green sub-elements since these blue sub-elements are covered by the mask 803a.

The base sheet is next moved to a second position under the first shadow mask so that the set of second color sub-elements may be formed. For example, the blue sub-element areas may now be positioned under the holes 804a of the first shadow mask 803a. The time duration of the sputtering is selected so as to achieve the desired thickness of the optical cavity that will result in transmission of the second color. If there are only two colors in the first set of rows, then this sputtering process is repeated for the first shadow mask so as to continue forming the first set of rows of the base sheet. The base sheet includes the first set of formed rows as it exits the first shadow mask. As shown in area 806a, the base sheet includes rows of alternating blue and green sub-elements.

The second set of rows may be formed in a similar manner and may be formed while the first set of rows is being formed on a lagging part of the base sheet. For instance, as the base sheet incrementally moves under the second shadow mask 803b, the second set of rows may be formed by sputtering an optical cavity layer through a second set of holes 804b. For instance, the red sub-elements may be formed at a first stationary position of the base sheet by sputtering the optical cavity material through the second set of holes 804b for a time duration that is selected to form a red color. When the base sheet is moved to a second stationary position so that the white sub-elements are under the holes 804b, sputtering can be inhibited in the second optical cavity module so that no optical cavity material is sputtered through the holes 804b of the second mask 804b. If a further color is desired, the optical cavity material may be sputtered through the holes 804b at this second position. In the illustrated example, the resulting base sheet then comprises a first set of blue and green rows and a second set of red and white rows in area 806b. The base sheet may then continue through additional sputtering modules (not shown). Although not shown, the base sheet may also be moved laterally (perpendicular to the direction 412 in FIG. 8) in some embodiments.

In an alternative embodiment, a sequence of shadow masks may be used, and these masks can have a pseudo random arrangement of holes with the appropriate area fraction of openings so as to get a consistent aggregate balancing of each primary color. For instance, consistent area fractions can be achieved for each color as long each mask in the sequence has the appropriate area fraction of openings. For example, two of these types of masks used sequentially would allow four gap heights (a DC height, dep 1, dep 2, dep 1+2) and create four colors with the appropriate area balancing for each on average. Of course, the gap heights may be dependent on one another. If the concept were extended to three masks, eight heights (DC, dep 1, dep 2, dep 3, dep 1+2, dep 2+3, dep 1+3, dep 1+2+3) could be achieved, while extending to more masks would result in even more heights (i.e., $2^n$ where n is the number of masks). Masks with this pseudo random arrangement of holes with the appropriate area fraction of openings would not need to have a precise alignment of each shadow mask in the sequence. After a base pattern is formed with such masks, a black dither pattern (or the like) can be printed later in the same way as with the "ordered" sub-element arrangement, as long as the pattern created by the base sheet is analyzed properly ahead of time. Presumably each base sheet will look the same so the analysis only has to happen one time.

In general, any number of mask configurations and sputtering time durations may be combined to form any number and type of base sheet patterns. When a multi-staged sputter process is used to create one or more base sheets, full color interferometric images can then be efficiently created by using standard printing techniques on portions of a base sheet. These sputtering and printing techniques can be utilized at a substantially lower cost then conventional photolithography fabrication processes.

Although the foregoing has been described in some detail for purposes of clarity of understanding, certain changes and modifications may be practiced within the scope of the appended claims. Therefore, the present embodiments are to be considered as illustrative and not restrictive and not to be limited to the details given herein, but may be modified within the scope and equivalents of the appended claims.

What is claimed is:

1. A method of fabricating a static interferometric display device, comprising:
   using a plurality of sputtering modules to form a plurality of static interferometric elements on a substrate, wherein the static interferometric elements each have a plurality of interferometric sub-elements that are each comprised of an interferometric stack, wherein a first sub-element of each element is formed so that an interferometric modulation of light due to the first element's stack transmits at a first color and a second sub-element of each element is formed so that an interferometric modulation of light due to the second sub-element's stack transmits as a second color,
   wherein the sub-elements of each element are arranged with respect to each other so that all of the elements appear as a third color to a user if all the sub-elements of each element are left unmasked; and
   using a printing process to mask one or more sub-elements of one or more elements so as to form, with the elements, a static image having multiple colors.

2. The method of claim 1, wherein the sputtering modules are used so as to sequentially deposit a plurality of layers for each stack, including an optical cavity layer, wherein the optical cavity layer of each sub-element of each element is formed by sputtering a material through one or more shadow masks that are configured to produce a first optical cavity thickness for the first sub-element of each element and a second optical cavity thickness for the second sub-element of each element.

3. The method of claim 2, wherein the one or more shadow masks include a plurality of parallel slots having a repeating pattern of different lengths, wherein the substrate continuously moves along the lengths of the slots so that a plurality of optical cavity lines are formed, wherein the optical cavity lines have a repeating pattern of different optical cavity thicknesses that correspond to the repeating pattern of different lengths of the slots of the shadow mask.

4. The method of claim 3, wherein the optical cavity lines contribute to transmission of a repeating pattern of differently colored lines, including a red line, a green line, a blue line, and a white line.

5. The method of claim 3, wherein the optical cavity lines contribute to transmission of a repeating pattern of differently colored lines, including a cyan line, a magenta line, and a yellow line.

6. The method of claim 1, wherein the sputtering modules are used to sequentially deposit a plurality of layers for each stack, including an optical cavity layer, wherein the optical cavity layer of each sub-element of each element is formed by sputtering an optical cavity material through one or more shadow masks that are configured to produce a plurality of different optical cavity thicknesses for the different sub-elements of each element so that an interferometric modulation of light due to the different stacks of each element transmit different colors.

7. The method of claim 6, wherein the one or more shadow masks include a plurality of holes through which the optical cavity material is sputtered, wherein the optical cavity material is sputtered through different sets of the holes for different time durations so as to form the different optical cavity thicknesses.

8. The method of claim 7, wherein the different optical thicknesses of the different sub-elements of each element form a parallel line pattern of different colors.

9. The method of claim 7, wherein the different optical thicknesses of the different sub-elements of each element form a checkerboard pattern of different colors.

10. The method of claim 7, wherein the different time durations are accomplished by sputtering the optical cavity material through differently sized holes as the substrate moves beneath the one or more shadow masks so that more optical cavity material is deposited through a larger hole on a same area of the substrate than a smaller hole.

11. The method of claim 7, wherein the different time durations are accomplished by sputtering the optical cavity material through different sets of same sized holes of the one or more shadow masks for different time durations.

12. The method of claim 1, wherein the printing process is an ink jet or laser printing process.

13. The method of claim 1, wherein the substrate is flexible.

14. The method of claim 1, wherein each masked sub-element is masked with black ink so as to subtract at least a portion of the transmitted color of the sub-element.

15. The method of claim 1, wherein each masked sub-element is masked with ink that has a different color than any of the colors transmitted by the sub-elements.

16. The method of claim 1, wherein each masked sub-element is masked with ink that has a same color as at least one of the colors transmitted by an unmasked sub-element so as to enhance the same color of the unmasked sub-element.

17. The method of claim 1, further comprising laminating a surface of the interferometric elements upon which masking has been performed by the printing process.

18. The method of claim 1, wherein at least one of the sputtering modules is used with a shadow mask to form one or more marks positioned with respect to the elements so as to provide an alignment mechanism for the printing process.

* * * * *